United States Patent
Naylor et al.

(10) Patent No.: US 10,148,914 B2
(45) Date of Patent: *Dec. 4, 2018

(54) INTRUSION DETECTION WITH DIRECTIONAL SENSING

(71) Applicant: VSK Electronics NV, Harelbeke (BE)

(72) Inventors: Matthew Naylor, Myrtle Bank (AU); Jörg Tilkin, Harelbeke (BE); Gerdy Maelbrancke, Harelbeke (BE); Philippe Cornez, Harelbeke (BE); Domenico de Lellis, Harelbeke (BE); Luc Roels, Harelbeke (BE); Philippe Pignatta, Harelbeke (BE); Ali Bas, Harelbeke (BE); Eniko Palfi, Harelbeke (BE)

(73) Assignee: VSK Electronics NV, Harelbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,033

(22) Filed: Aug. 12, 2015

(65) Prior Publication Data

US 2015/0348383 A1 Dec. 3, 2015

Related U.S. Application Data

(63) Continuation of application No. 14/636,334, filed on Mar. 3, 2015.
(Continued)

(30) Foreign Application Priority Data

Mar. 28, 2014 (AU) ................. 2014901121

(51) Int. Cl.
*G08B 13/196* (2006.01)
*H04N 7/18* (2006.01)
*H04N 5/232* (2006.01)

(52) U.S. Cl.
CPC ......... *H04N 7/18* (2013.01); *G08B 13/19613* (2013.01); *G08B 13/19682* (2013.01);
(Continued)

(58) Field of Classification Search
CPC ........ G08B 13/19613; G08B 13/19682; H04N 7/188; H04N 7/183
(Continued)

(56) References Cited

U.S. PATENT DOCUMENTS 6,625,310 B2   9/2003  Lipton et al.
6,669,945 B1  12/2003  Nardin et al.
(Continued)

FOREIGN PATENT DOCUMENTS

EP    1811457 A1    7/2007
JP    03-242592 A  10/1991
(Continued)

OTHER PUBLICATIONS

"U.S. Appl. No. 14/636,334, Non Final Office Action dated Jul. 13, 2015", 23 pgs.
(Continued)

*Primary Examiner* — On S Mung
(74) *Attorney, Agent, or Firm* — Schwegman Lundberg & Woessner, P.A.

(57) ABSTRACT

A method and system of intrusion detection, which includes displaying sensing device output data as an image of a field of view of a sensing device. Through interaction with a GUI: a user input defines an image detection area in relation to the image of the field of view, the image detection area being correlated to a detection area to be monitored for intrusion detection. A user input defining a detection vector in the image detection area is received, specifying a predetermined minimum displacement and displacement direction in the field of view. A graphical representation of the vector may (Continued)

be displayed on the image detection area. A target object is detected and tracked through the detection area and it is determined whether the progressive displacement of the target object has a component exceeding the minimum displacement in the direction of the vector.

25 Claims, 9 Drawing Sheets

Related U.S. Application Data

(60) Provisional application No. 61/947,335, filed on Mar. 3, 2014.

(52) U.S. Cl.
CPC ......... *H04N 5/23216* (2013.01); *H04N 7/188* (2013.01); *G08B 13/19656* (2013.01); *H04N 7/181* (2013.01); *H04N 7/183* (2013.01)

(58) Field of Classification Search
USPC .................................. 348/143, 155, 156, 169
See application file for complete search history.

(56) References Cited

U.S. PATENT DOCUMENTS

| | | | |
|---|---|---|---|
| 6,970,083 | B2 | 11/2005 | Venetianer et al. |
| 7,224,852 | B2 | 5/2007 | Lipton et al. |
| 7,577,199 | B1 | 8/2009 | Herz |
| 7,646,401 | B2 | 1/2010 | Lipton et al. |
| 9,237,315 | B2 | 1/2016 | Naylor |
| 2003/0227548 | A1* | 12/2003 | Kawakami ............. H04N 7/183 348/152 |
| 2005/0046702 | A1* | 3/2005 | Katayama ............. G06T 15/205 348/222.1 |
| 2005/0169367 | A1 | 8/2005 | Venetianer et al. |
| 2006/0115113 | A1* | 6/2006 | Lages ................... G01S 3/7864 382/103 |
| 2006/0139164 | A1* | 6/2006 | Tsuji ....................... G01S 13/08 340/522 |
| 2006/0291694 | A1 | 12/2006 | Venetianer et al. |
| 2007/0063840 | A1* | 3/2007 | Jentoft ............. G08B 13/19641 340/541 |
| 2009/0121888 | A1* | 5/2009 | Reeves ................... G01S 13/88 340/669 |
| 2009/0141939 | A1* | 6/2009 | Chambers ........ G08B 13/19613 382/103 |
| 2009/0207172 | A1* | 8/2009 | Inoue ..................... H04N 19/61 345/427 |
| 2009/0220123 | A1* | 9/2009 | Tojo ................... G06K 9/00771 382/103 |
| 2011/0058036 | A1* | 3/2011 | Metzger ................. H04N 7/181 348/143 |
| 2014/0160294 | A1* | 6/2014 | Naylor ............. G08B 13/19606 348/155 |
| 2015/0249807 | A1 | 9/2015 | Naylor et al. |

FOREIGN PATENT DOCUMENTS

| | | |
|---|---|---|
| JP | 09-330415 A | 12/1997 |
| JP | 200-295600 | 10/2000 |
| TW | 200742688 | 11/2007 |
| TW | 201215435 | 4/2012 |

OTHER PUBLICATIONS

"U.S. Appl. No. 14/636,334, Notice of Allowance dated Sep. 22, 2015", 8 pgs.

"U.S. Appl. No. 14/636,334, Response filed Aug. 14, 2015 to Non Final Office Action dated Jul. 13, 2015", 11 pgs.

"International Application Serial No. PCT/EP2015/054445, International Search Report dated May 7, 2015", 4 pgs.

"International Application Serial No. PCT/EP2015/054445, Written Opinion dated May 7, 2015", 16 pgs.

Bradski, Gary, et al., "Chapter 10: Tracking and Motion", *In: Learning OpenCV*, O'Reilly Media, Inc., (2008), 316-369.

Ishii, Takeyuki, et al., "Human behavior detection method with direction change invariant feature", *2013 7th International Symposium on Medical Information and Communication Technology (ISMICT)*, (2013), 257-261.

"Chinese Application No. 201580021058.7, Notification of the First Office Action dated Mar. 27, 2018", (Mar. 27, 2018), 11 pgs.

\* cited by examiner

INTRUSION DETECTION WITH DIRECTIONAL SENSING

CLAIM OF PRIORITY

This application is a continuation of and claims the benefit of priority under 35 U.S.C. § 120 to U.S. patent application Ser. No. 14/636,334, filed on Mar. 3, 2015, which claims the benefit of priority under 35 U.S.C. § 119(e) of U.S. Provisional Patent Application Ser. No. 61/947,335, filed on Mar. 3, 2014, and the benefit of priority under 35 U.S.C. § 119 of Australia Patent Application No. 2014901121, filed on Mar. 28, 2014, the benefit of priority of which is claimed hereby, and which are incorporated by reference herein in their entirety.

FIELD OF THE INVENTION

The present invention generally relates to a security system for detecting intruders at a site being monitored. More specifically, the invention relates to a system and method of directional detection employing video capture.

BACKGROUND OF THE INVENTION

Video motion detection (VMD) is frequently used in the current security industry for detecting intruders entering a site, with predetermined scenes of interest. VMD is performed by computer software on a sequence of digital images captured by a video camera that is monitoring a particular scene of interest. Each image in the sequence is composed of an array of picture elements (pixels). Targets such as intruders typically show up in an image as a different intensity to the background scene in a captured image. VMD uses this in order to detect intruders in the sequence by looking for changes in pixel intensities that are consistent with a target moving through the scene. Groups of pixels associated with a target are also tracked from frame to frame to determine the direction of motion. If the scene is calibrated, the size of the target, the distance it has traveled, and the speed of its travel can be estimated from the tracked group of pixels. By ignoring targets that do not meet size, speed, and distance traveled criteria, the related security systems can be tuned to detect human and vehicle movement while rejecting small animal and foliage movement. Furthermore, a current VMD system is typically set up by defining which parts of the scene are to be sensitive to movement. By specifying large areas of the scene as sensitive, a highly effective detection system can be established in which intruders may be detected anywhere within those detection areas. Careful placement of these detection areas can also avoid false alarms from areas of no interest, such as car-parks or streets adjacent an area of interest.

One of the drawbacks of existing VMD systems is that existing systems are sensitive to all changes of intensity in the scene of interest. It is therefore possible to potentially detect the shadows and headlights of moving vehicles. If these shadows or headlight beams enter a detection area, and their movement meets the detection criteria, such movement will be wrongly detected as targets, even if the vehicles themselves are outside the detection area. This type of false alarm commonly occurs when vehicles travel down a road that is outside of, but runs parallel to, the boundary of an area being protected.

In more recent VMD systems, trigger lines have been adopted to reduce false alarms. With these systems the target has to cross the trigger line to cause an alarm, which reduces the likelihood of a false alarm by the specificity of the line placement. However, this detection method may also be undesirable because the trigger line must be carefully placed to ensure that all possible real target trajectories will cross the trigger line. Furthermore, in non-ideal conditions, it is possible that the target track will be lost and restarted as the target moves through the scene. If the target crosses the trigger line while not being tracked, no alarm will be raised. To reduce the effect of this possibility multiple, parallel trigger lines are often needed. Irrespective, the use of single or multiple trigger lines also does not prevent false alarms caused by shadows and headlight beams because these target tracks may still cross the necessary trigger lines due to the way the beams or shadow changes as the vehicle passes adjacent to the area of interest.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In one aspect, the invention broadly provides for a method and system that allow for the input of a detection vector which is associated with an image detection area identified on a video image received from a sensing device. The detection vector specifies a predetermined minimum displacement and direction of displacement in a detection area monitored by the sensing device, and is displayed as a graphical representation on the image detection area. The method and system extend to detecting and tracking a target object at least in part in the detection area, and if it is determined that the progressive displacement of the target object has a component which exceeds the minimum displacement in the direction of the detection vector, an alarm condition is activated.

According to a first aspect of the invention there is provided a method of intrusion detection, the method including:

displaying sensing device output data as one or more images of a field of view of a sensing device;

through a graphical user interface:

receiving user input to define and display an image detection area in relation to the one or more images of the field of view, wherein the image detection area is correlated to a detection area to be monitored by the sensing device for intrusion detection;

receiving user input that defines a detection vector specifying a predetermined minimum displacement and direction of displacement in the field of view to be monitored wherein a graphical representation of the detection vector is (overlayed and) displayed on the image detection area;

detecting a target object; and tracking the target object at least partially through the detection area and determining whether the progressive displacement of the target object has a component which exceeds the minimum displacement in the direction of the detection vector.

The method may further include activating an alarm condition if the target object's displacement has a component which is determined to exceed the minimum displacement in the direction of the detection vector, wherein either an initial position of the target object or the position of the target object where the minimum displacement is exceeded, is within the detection area.

Preferably, the method may further include activating an alarm condition if the target object's displacement is only within the detection area and the target object's displacement exceeds the minimum displacement.

The component of displacement in the direction of the detection vector may be determined with the use of the equation:

$$I = \frac{\vec{S} \cdot \vec{D}}{|D|}$$

where I is the component of displacement in the direction of the detection vector;

vector $\vec{S}$ represents a distance and direction of the target object as tracked through the detection area in a three-dimensional area; and vector $\vec{D}$ represents the detection vector.

The tracking of the target object may therefore start either from the initial position where displacement is detected or from the position where the target object is detected within the target area for the first time.

The sensing device may be a surveillance camera or the like.

The image detection area is a surface in a three-dimensional space onto which object movements in the corresponding two-dimensional image are projected and interpreted.

The detection area may be defined as directional by specifying the detection vector in relation to the detection area.

Optionally, the detection vector may be specified as bidirectional, wherein an alarm condition is activated when it is determined that the progressive displacement of the target object exceeds the minimum displacement in either direction of the vector.

The graphical representation of the detection vector may be overlaid on the image detection area as a flat arrow on a two-dimensional image plane. The end points of this flat arrow detection vector may then be mapped to corresponding points in the detection area monitored by the sensing device, thereby to define the direction and minimum displacement in the detection area monitored.

Alternatively, the graphical representation of the detection vector may be overlaid on the image detection area as a three-dimensional arrow detection vector within the detection area monitored, wherein the position of the end points of the three-dimensional area may then be correlated with the image detection area, thereby to enable the rendering of the detection vector in the correct perspective.

The user inputs defining the detection vector may be received through one or more inputs of a pointing device on the graphical user interface, one or more inputs through a touch screen, one or more inputs of coordinates of the detection vector, an input of an angle of direction with relation to an axis, and/or an input of a numerical value.

For example, the displacement and/or direction of the detection vector may be defined or adjusted through manipulation of the arrows via the graphical user interface. For example, a user may change the direction of the detection vector by clicking and dragging the end-points of the arrow with a click and point device, such as a computer mouse on a display.

Alternatively, the displacement and/or direction of the detection vector may be defined or adjusted by receiving a numerical value for the length and/or angle of direction of the detection vector from a user through the graphical user interface. For example, the angle may be specified with respect to an x or y axis of a two-dimensional image plane. Alternatively, the angle may be specified in terms of a navigational bearing in the three-dimensional space. The method may then further include rendering the detection vector as an arrow at that angle on the image detection area.

The direction of the detection vector may additionally be determined as perpendicular to a particular edge of the detection area, after the user has selected the particular detection area edge through the graphical user interface.

The length of the graphical representation of the detection vector as displayed on the image detection area may not to be scale.

The step of tracking the target object at least partially through the detection area may include estimating a target object path from discreet detections of the target object within the field of view, preferably within the detection area, of the sensing device. The step of estimating the target object path may further include predicting various sections of the target object path. For example, the estimation step may include one or more of the following:

predicting the target object path prior to the initial detection of the target object by back-predicting where the target object may have entered the field of view to the position of initial detection;

predicting the target object path between discreet detections of the target object; and predicting the target object path between the final point of detection of the target object in the field of view and where the target object is likely to have left the field of view.

Any and all positions of the target object along the estimated target object path may provide a position of the target object to assess when the target object is in the detection area and for determining whether the progressive displacement of the target object exceeds the minimum displacement in the direction of the detection vector.

According to a further aspect there is provided a system including:

a user interface in order to receive inputs from a user of the system;

at least one processing unit and at least one memory for storing instructions for execution by the at least one processing unit, the instructions executed to:

display sensing device output data as one or more images of a field of view of a sensing device;

through a graphical user interface:

receive user input to define and display an image detection area in relation to the one or more images of the field of view, wherein the image detection area is correlated to a detection area to be monitored by the sensing device for intrusion detection; and receive user input that defines a detection vector specifying a predetermined minimum displacement and direction of displacement in the field of view to be monitored, wherein a graphical representation of the detection vector is displayed on the image detection area;

detect a target object; and track the target object at least partially through the detection area and determining whether the progressive displacement of the target object has a component which exceeds the minimum displacement in the direction of the detection vector.

The instructions may be executed to implement any of the other method steps as defined above.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

Some embodiments are illustrated, by way of example only, with reference to the accompanying drawings in which:

FIG. 2b shows the corresponding three-dimensional planar detection area of the image coordinate view of FIG. 2a;

DETAILED DESCRIPTION OF THE EMBODIMENTS

Figure 1:
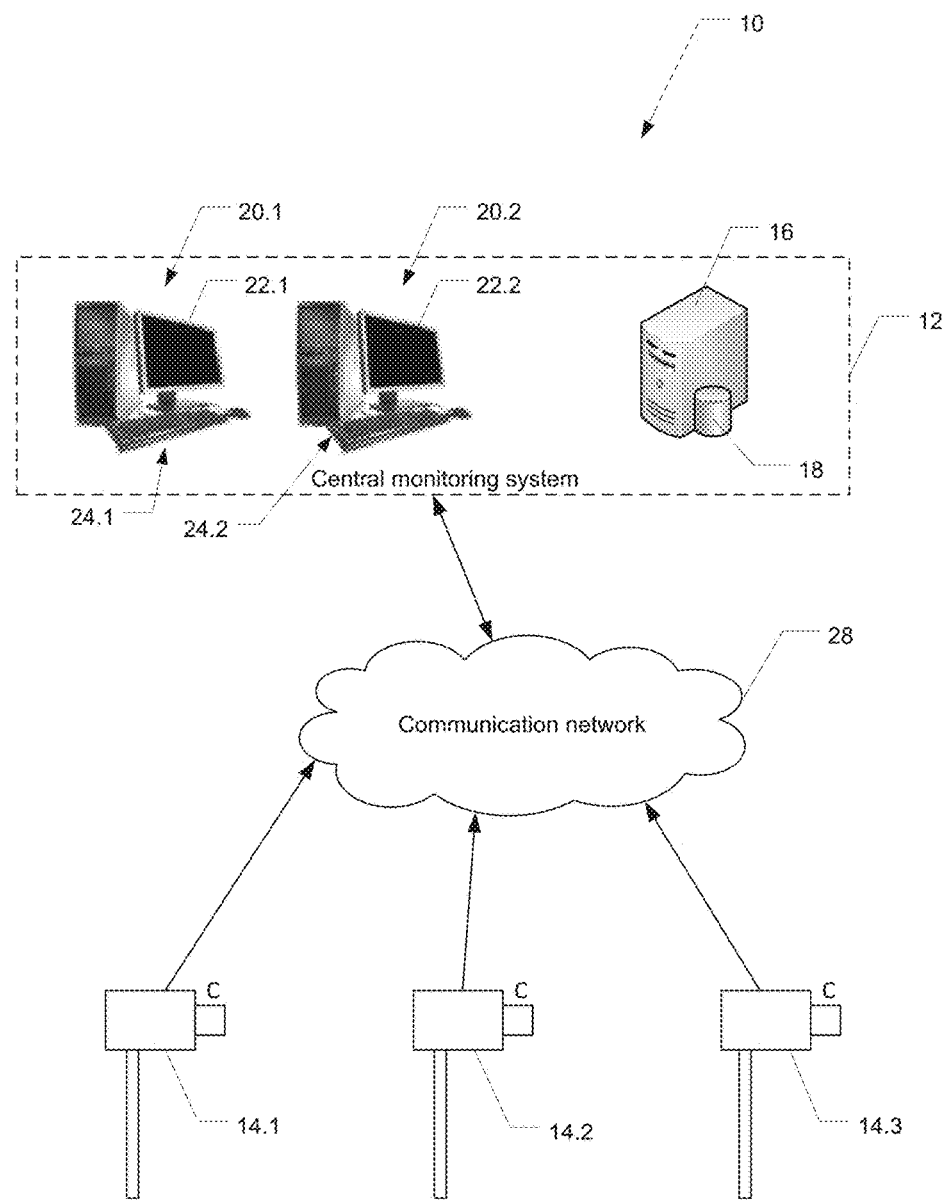
FIG. 1 shows a schematic diagram of an intrusion detection system formed by a central monitoring system and a number of sensing devices, in accordance with an example embodiment.

The present embodiments are directed to a method of and system for intrusion detection in which an operator of an intrusion detection system, through the use of a graphical user interface, specifies a detection vector which is associated with a particular image detection area. The image detection area is selected by the operator through the use of the graphical user interface, with the image detection area correlating to a detection area to be monitored by a sensing device of the intrusion system.

The detection vector, when associated with a detection area, represents a minimum displacement in a specific direction. The intrusion detection system is configured to activate an alarm in the event that a target object, e.g., an intruder, is detected and tracked, it being determined that the progressive displacement of the target object has a component which exceeds the minimum displacement in the direction of the detection vector. In other words, when the target object moves at least a minimum distance in the direction indicated by the vector, an alarm is raised.

The intrusion detection system 10 comprises, in one example embodiment, a central monitoring station 12 which is in communication with one or more sensing devices that monitor a number of areas for various threat events. At least some of the sensing devices are surveillance cameras, indicated by reference numerals 14.1, 14.2 and 14.3 that may be of the type that provides video content, either as video streams or one or more images, to the central monitoring station 12. Thus, the surveillance cameras 14.1, 14.2 and 14.3 may be video cameras. Each of these surveillance cameras is commissioned to have a field of view, typically in an area close to an area with restricted access. The surveillance cameras communicate with the central monitoring system over a suitable network 28.

The central monitoring station 12 typically comprises a server 16 and data storage 18 in the form of one or more databases that store information on sensing devices and the intrusion detection system. The central monitoring station 12 also has one or more operator stations (two operator stations indicated by reference numerals 20.1 and 20.2) that are connected to the server 16 and databases 18 thereby to enable the operators to access relevant data to enable intrusion detection processes by the system. Each operator station includes one or more user interfaces 22.1, 22.2 to display and receive information into the central monitoring system 12. In one example embodiment, the user interface 22.1, 22.2 may be a display screen 24.1, 24.2 with a keyboard 26.1, 26.2 and mouse (not shown). The user interface may also be a touch screen, in some example embodiments.

The central monitoring station 12, either the server or the operator stations, has one or more processing units and memory, for storing instructions for execution by the processing units. The stored instructions enable the central monitoring station 12 to perform various functions and to process received data, as will be described in more detail below. Although functionality is described with relation to the central monitoring station 12, it will be appreciated that all functions need not be performed by the central monitoring station 12 and that some of the processes could be executed on other devices. For example, some of the operations and functionality relating to conditions and alarms may be computed on intelligent surveillance cameras, in an intelligent hub, in a cloud service remote from the central monitoring station 12 or the like.

Figure 2A:
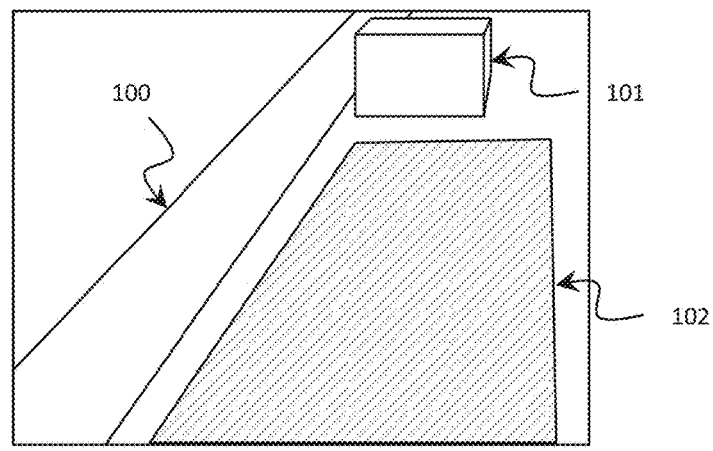
FIG. 2a shows an image coordinate view of a detection area.

Turning now to FIG. 2*a*, a computer screen or display is shown to display an image of a field of view of a particular surveillance camera. The image is an output of the surveillance camera and is in this example embodiment transmitted to the central monitoring station 12. The image is a two-dimensional representation of the field of view, and shows a road 100, a building 101 and a detection area 102, also called the image detection area. In one example embodiment, the image detection area is defined by an operator as an area which is specifically to be monitored against intrusion. Thus, the purpose of the image detection area 102 is to detect intruders, also called target objects below, that might cross from the road 100 to the protected premises off-screen to the right of the detection area 102. The operator may define the image detection area through a graphical user interface, generated by the central monitoring station 12, and once defined, the image detection area 102 is to be displayed in relation to the image of the field of view. For example, in FIG. 2*a*, the image detection area 102 is indicated by cross-hatching.

Figure 2B:
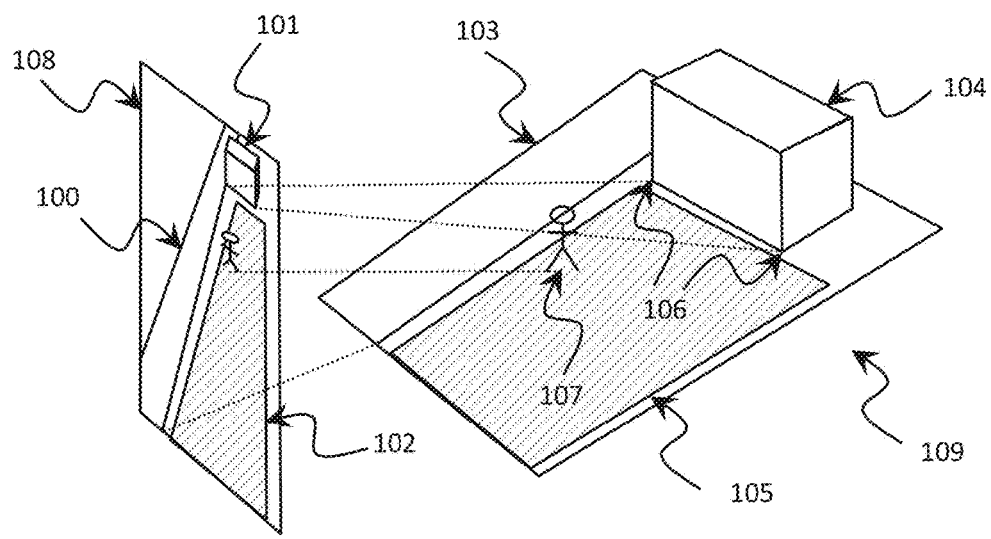

FIG. 2*b* shows graphically the correlation between the image which is displayed on the computer screen, i.e. a two-dimensional image 108 and the field of view of the surveillance camera, i.e. a three-dimensional scene 109. A road 103 that runs through the field of view is represented in the image 108 by the road 100, while the building 104 is represented by its image 101 in the image 108. The image detection area 102 entered through the graphical user interface and displayed on the computer screen as part of the image 108, corresponds to a virtual three-dimensional planar detection area 105 in the three-dimensional scene 109.

It can be seen from FIG. 2*b* that the image detection area 102 as displayed on the computer screen and the virtual three-dimensional detection area 105 may not be in parallel planes, and that a line, such as a detection vector described in more detail below, drawn on one may appear at a different angle when viewed from the other. Furthermore, it will be apparent that, as an object moves towards the building 104, i.e. further away into the scene, the image of that object in the two-dimensional image 108 will move up into the screen and appear smaller. In order to correlate points between the two-dimensional image 108 and the field of view of the surveillance camera, it is necessary to do some calibration of the system. For example, by recording the location of points in the field of view of the camera 109, on the three-dimensional plane, and then correlating these locations with their corresponding locations on the two-dimensional image 108 displayed on the screen, mapping between the areas, in particular the two-detection areas, is established. These points could, for example, be feature points 106 on the plane in the scene, or locations of a person 107 or other target moving around on the plane in the scene during calibration. The process of correlation between a two-dimensional image and a three-dimensional plane is described in more detail further below.

In order to define a detection area as directional, an operator is to define a detection vector. In this example embodiment, the monitoring station receives a user input, again through the graphical user interface, that specifies the detection vector. The detection vector is specified in relation to a particular area, i.e. the image detection area 102, and a graphical representation of the detection vector is then displayed on the image detection area on the screen of the monitoring station. The detection vector specifies a predetermined minimum displacement and direction of displacement, which displacement and direction in relation to a target object is used in the determination of activating an alarm.

As will become apparent from the description below, user input to define the detection vector may comprise one or multiple user inputs. The one or more user inputs may be received through one or more inputs of a pointing device (e.g., a mouse) on the graphical user interface, one or more inputs through a touch screen or similar device, one or more inputs of coordinates of the detection vector, an input of an angle of direction with relation to an axis, and/or an input of a numerical value to represent the length of the vector. The input of numerical values may, e.g., be entered into a data input field provided by the graphical user interface.

Any combination of these inputs may be used by the user to define the detection vector. For example, in one embodiment the user may use interaction between a mouse and the graphical user interface to define a direction of a detection vector, while the displacement (or length) defined by the detection vector may be specified through a text input via the graphical user interface.

The detection vector is displayed, and in some cases overlayed, as an arrow 201 on the two-dimensional image. In one embodiment of the invention, an operator selects a detection area, then presses one of the arrow buttons on the graphical user interface (or the mouse) to make that area directional. The system is then to place a detection vector arrow on the selected detection area.

Figure 3A:
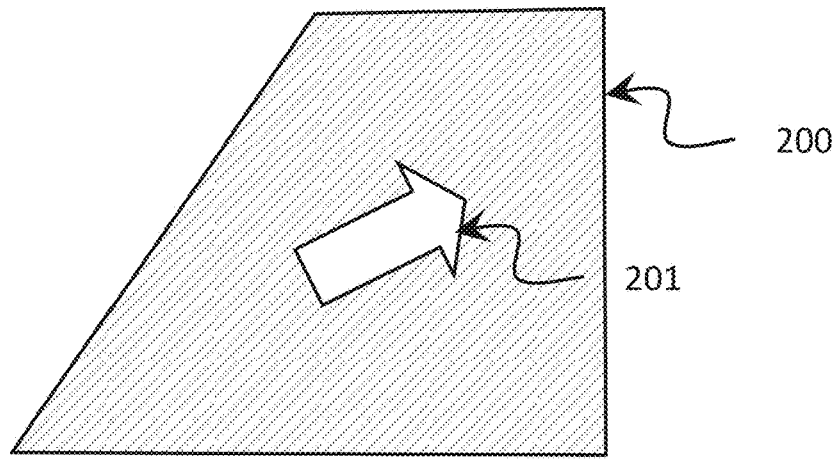
FIG. 3a shows an image coordinate view of a directional image detection area including an arrow representing a detection vector in accordance with an example embodiment.

For example, the detection vector may appear to sit on the image detection area 200 as in FIG. 3*a*. In one embodiment, the end points of this flat arrow detection vector is mapped to corresponding points in the detection area monitored by the surveillance camera, thereby to define the direction and minimum displacement in the detection area monitored.

Figure 3B:
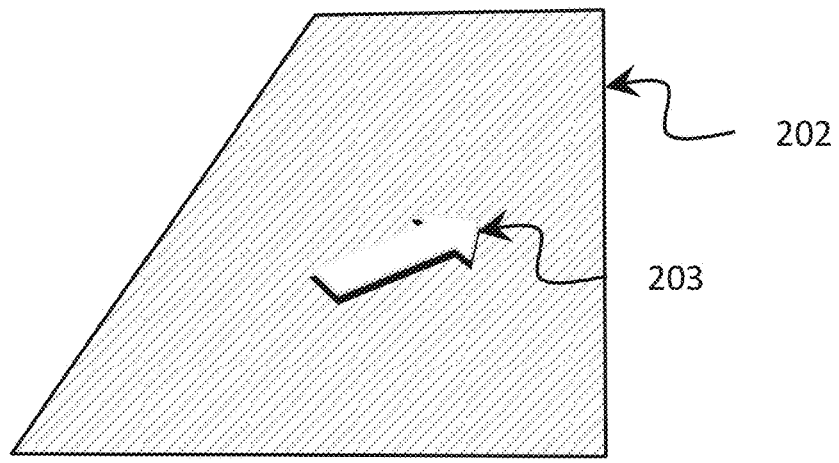
FIG. 3b shows a view of a detection vector represented by an arrow drawn to look as if placed on a three-dimensional planar detection area, in accordance with an example embodiment.

Alternatively, the detection vector could be given a three-dimensional appearance as in FIG. 3*b* where the arrow 203 appears to sit on the virtual three-dimensional detection area 202. In this case, the position of the end points of the three-dimensional area is correlated with the image detection area, thereby to enable the rendering of the detection vector in the correct perspective.

The user can adjust the detection vector's angle by dragging its end-points with a point and click device, such as a computer mouse. As mentioned, other user input means, such as a touch screen, may also be used. Alternatively, an angle can be entered manually (numerically) through the graphical user interface (e.g., through a data input field presented on the graphical user interface), and the arrow drawn automatically on the detection area at that angle. For example, the angle may be specified with respect to an x or y-axis of a two-dimensional image plane. Alternatively, the angle is specified in terms of a navigational bearing in the three-dimensional space.

In another embodiment, the system may be configured to automatically determine a detection vector to be perpendicular to a selected edge. For example, when configuring a detection area and detection vector, a user may select one edge of the directional area, and have the system then automatically determine and use a direction that is at right-angles to that edge for a detection vector associated with the detection area. In one example, the system could automatically correct the direction of a detection vector already placed in the detection area to this perpendicular direction, or alternatively, the system could restrict any detection vectors created after selection of the particular edge to have a direction perpendicular to the edge. For example, the graphical user interface could prompt a user or provide a user with an option to select a detection area edge thereby to apply a right-angled direction to an edge to the detection vector. Any other suitable way of implementing the restriction of direction on a detection vector could also be employed.

In one embodiment, the system 12 determines the direction of the vector by first computing the end points of the selected edge of the detection area, computing the direction of that edge, and computing a direction that is at right-angles to that direction, while still remaining in the plane of the detection area. It will be appreciated that, where appropriate, intermediate positions on the selected edge could also be used. The direction of the detection vector could be computed for the two-dimensional image detection area, giving a direction that appears to the user as perpendicular to the edge, or it could be computed for the three-dimensional detection area, in which case the vector will appear to the user as being in a perspective three-dimensional direction perpendicular to the three-dimensional area.

In some example embodiments, the length of the detection vector arrow as displayed is not to scale. For example, the graphical representation of the detection vector as displayed on the image detection area, in particular the length of the graphical representation of the detection vector may not be to scale in instances where the length of the vector is input as a numerical value through the graphical user interface.

Irrespective, the length of the detection vector can be stretched by an operator using a mouse or other suitable input device. As the detection vector arrow is stretched, a tooltip or other indicator displays in meters (or feet) the length the arrow represents. The distance represented by the arrow length is used as the minimum distance for this directional area regardless of the setting in the configuration file.

In one example embodiment, the length in real-world coordinates is neither computed nor displayed by the client interface. Rather, the image coordinates of the detection vector arrow are sent to an analytics engine forming part of the monitoring station, where the image coordinates are converted to a calibrated distance, whereafter it is used.

In some instances, the detection vector may also be specified as bidirectional. With a bidirectional vector, an alarm condition is activated when it is determined that the progressive displacement of the target object exceeds the minimum displacement in either direction of the vector.

The surveillance camera continuously monitors its field of view, in particular the detection area, for any target objects. Video motion detection (VMD), as described above, may be used for such detection in that picture elements are monitored to identify target objects. Object targets tend to show up in an image with a different intensity to the background scene in a captured image. Groups of pixels associated with an object target are also tracked from frame to frame to determine a path of motion. As the scene is typically calibrated, the size of the object target, the distance it has traveled, as well as the direction can be estimated from the tracked group of pixels.

Thus, when an object travels through the field of view of the camera, the central monitoring station 12 processes images of the field of view captured by surveillance cameras at discrete time intervals, locates the target object in each image, and computes its trajectory so that the distance it has traveled (its displacement) can be computed. If the trajectory is computed on the virtual three-dimensional detection area, then the distance can be expressed in real-world dimensions such as meters traveled.

Figure 4:
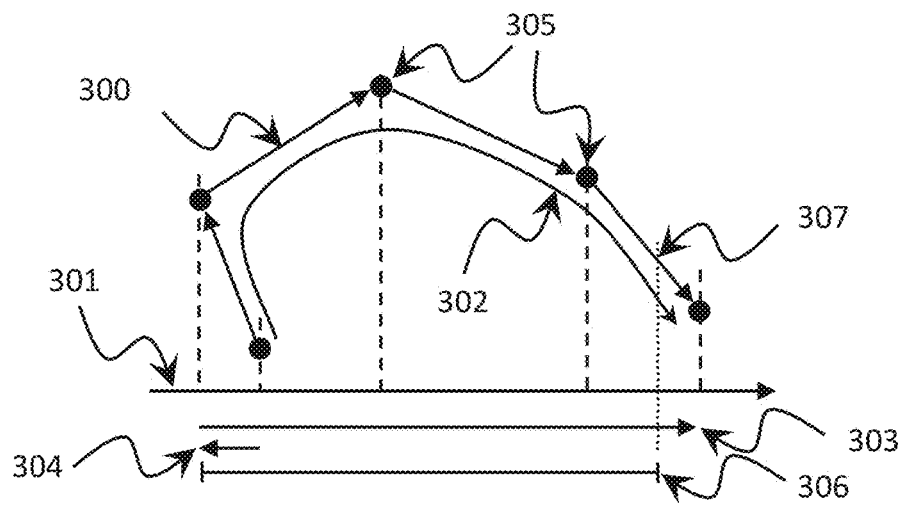
FIG. 4 shows graphically how the accumulated distance traveled in the detection vector direction in three-dimensional coordinates may be computed, in accordance with an example embodiment.

FIG. 4 shows graphically how the distance may be computed with relation to displacement in two dimensions.

The target object is observed by the central monitoring station 12 at discrete locations 305, and the trajectory 300 is computed from these. The actual length of the trajectory 300 can be computed by summing the segment lengths along path 302. However, if directional criteria are introduced, the segment lengths must be projected onto a line 301 in the direction of interest, and those projections summed giving a path length 303. Thus, for a progressive displacement of the target object, components in the direction of the detection vector are determined, which components are used to determine whether the minimum displacement identified by the detection vector has been exceeded.

These components may be determined by obtaining the dot products of the relevant vectors, for example determining the scalar projection (or scalar component) of a particular displacement in the direction of the detection vector.

If the reverse direction is of interest, or the direction is bidirectional, then the distance 304 is also of interest. An alarm activation is only to occur if the distance in the direction of the detection vector exceeds the minimum distance 306.

In one example embodiment, where images of the field of view and detection area are not monitored on a continuous basis, estimations may be used between the various sample points. Estimating the target object path may include predicting travel along various sections of the target object path. For example, the estimation step may include predicting the target object path prior to the initial detection position of the target object by back-predicting where the target object may have entered the field of view to the position of initial detection. Also, the target object path between discreet detections of the target object may be predicted, while the target object path may also be predicted between the final point and where the target object is likely to have left the field of view.

Thus, and as shown in the example of FIG. 4, the minimum distance may be met by a point 307 on the estimated trajectory 300 which is between the detection points or observations 305. This estimation is important when the observations are infrequent because the object may travel through a detection area with few or no observations inside the area. The continuum of points on trajectory 300, which will include points inside the detection area, will still be used to determine if the minimum distance has been exceeded. Note also that the estimated trajectory 300 may extend before the first observation, or beyond the last observation to account for objects that enter or leave the scene.

Figure 5A:
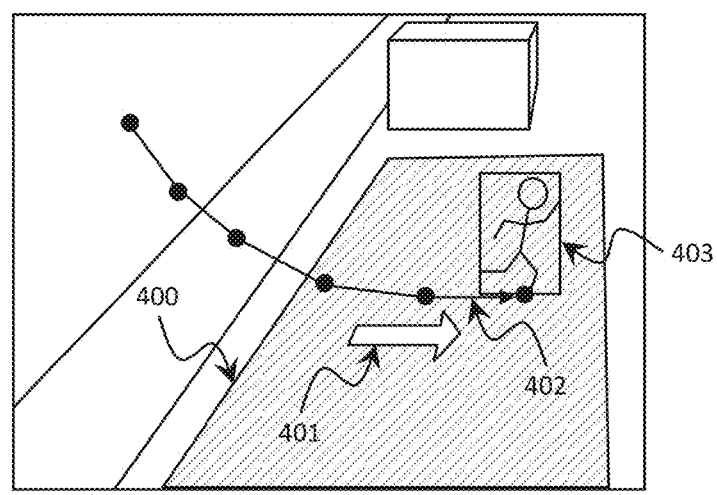
FIG. 5a shows an example where an intruder in the form of an target object crosses the boundary of a detection area and travels towards a monitored property, where the target object is detected by the use of directional sensing in accordance with an example embodiment.

If this example is applied to the scene depicted in FIG. 5a, it is shown that an intruder 403 crossing from the road 400 across the detection area in the direction 401 will travel further than a distance 402 in the direction of interest. If this displacement exceeds the minimum distance, then the system detects the intruder in accordance with the predetermined condition and an alarm may be activated.

Figure 5B:
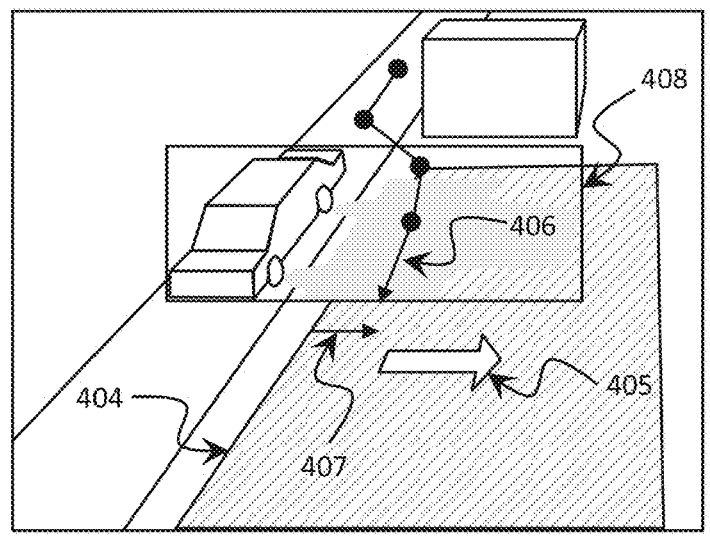
FIG. 5b shows how the same directional detection areas do not detect the lights or shadows of a vehicle travelling parallel to the boundary of a property being monitored in accordance with an example embodiment.

The converse case is depicted in FIG. 5b. Here, a car and its shadow 408 travel a distance 406, but in a direction that is not parallel to the direction of the detection vector 405. Despite the distance traveled by the car and shadow 408, the only distance traveled in the direction of the detection vector is shown by reference 407. If this is less than the minimum distance for detection area 404, then the movement of the target object will not be permitted to raise an alarm. This effectively reduces this cause of false alarms.

Figure 6:
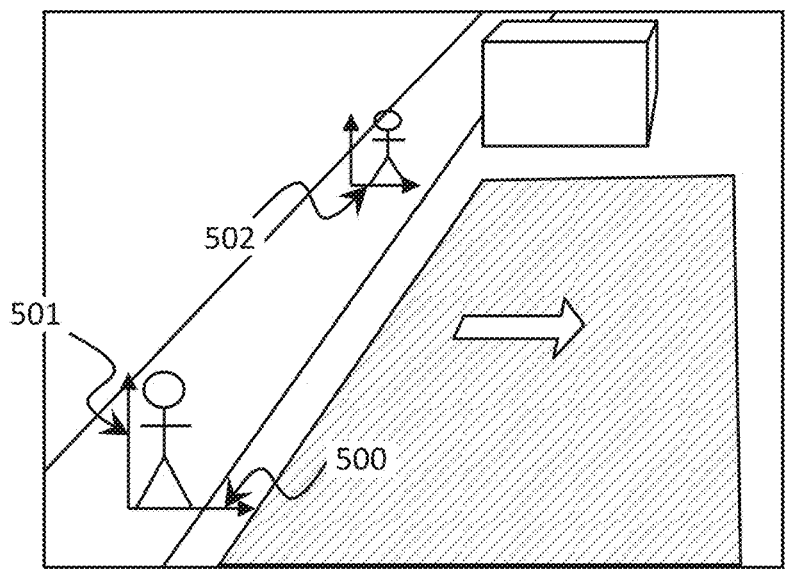
FIG. 6 shows how horizontal distances can be displayed when calibrating the heights in an area of detection, in accordance with an example embodiment.

To aid the user in defining a detection area that is longer than the minimum distance in the direction of interest, the scene scale at different points in the image could be drawn. This is shown in FIG. 6 where the horizontal distance 500 is displayed when the height 501 is being measured on a target in the scene. By doing this in more than one location, the horizontal distances 500 and 502 at different locations in the scene can be established.

The use of a planar detection area in the following description is not intended to exclude other possible detection area surfaces in the three-dimensional space, nor does it imply that it is necessary to approximate the detection area by a planar surface. The ground in a real scene is typically uneven, and the invention only requires knowing the mapping between that scene and the two-dimensional image of the scene.

One issue with requiring a minimum distance to be met is that it is difficult to estimate that length when drawing the detection area on the computer screen. Another example provides feedback to the operator so that the operator can accurately adjust the size of the detection area both in the near-field and in the far-field of the scene that is being monitored. The following aspects relate to this enhancement.

The detection vector appears to sit on the three-dimensional detection area with its length representing the minimum distance. In one instance the minimum distance is set by a numerical value, and the length of the detection vector arrow adjusts automatically as the detection vector arrow is manipulated so as to always show the correctly scaled minimum distance in the scene wherever it is placed on the computer screen. The scale changes as the detection vector arrow is moved through the scene because of scene perspective. In another instance, the length of the arrow is set by manipulating the end points of the arrow using a computer mouse. If it is then moved, the length adjusts automatically so as to always show the minimum distance wherever it is placed in the image.

In another instance, the feedback is provided when the scene is being calibrated. To provide enough information for the analytics engine of the monitoring station to determine the size and speed of targets in the image, it is necessary for the user to calibrate the scene. In this instance, as the user marks out the height of an object, a horizontal line of that length is displayed simultaneously. It is then clear to the user what that dimension looks like at that position in the image. Since calibration requires more than one measurement, the operator will be shown this dimension in more than one position in the image.

Transformations between a two-dimensional image and a three-dimensional scene as well as calculations to determine whether a minimum distance in the direction of a detection vector has been travelled are now described in more detail. In a particular scenario a transformation matrix T is used to transform a point i in two-dimensional image coordinates into a point s in three-dimensional scene coordinates. If we then consider two points $i_1$ and $i_2$ in this two dimensional image which correspond to two points on a path P of an object, it follows that a two-dimensional vector I joining points $i_1$ and $i_2$ could be transformed into a three-dimensional vector $\vec{S}$, joining points $s_1$ and $s_2$ as follows:

$$s_1 = Ti_1$$

$$s_2 = Ti_2$$

Therefore:

$$I \rightarrow \vec{S}$$

This vector $\vec{S}$ represents the distance and direction the object moved in three-dimensional coordinates between the two observations.

A directional area (detection area) where a user manipulates an arrow in two-dimensional image space, i.e. a detection vector, to specify the direction of that area is now considered. The endpoints of this arrow can be transformed to the three-dimensional space using the same transformation T to produce a directional vector $\vec{D}$. The unity vector representing the direction of $\vec{D}$ can be determined by dividing $\vec{D}$ by its magnitude $|D|$.

The component I of the length of $\vec{S}$ that lies in the direction of $\vec{D}$ can be calculated using the dot product (·) between $\vec{S}$ and the unity vector corresponding to $\vec{D}$ as follows:

$$I = \frac{\vec{S} \cdot \vec{D}}{|D|}$$

Note that the polarity of the result I is important as only values greater than zero are distances in the direction of interest. Values less than zero are in the opposite direction. If these distances/from consecutive segments of path P are summed together, taking account of the polarity of each I, then the combined distance of those segments along P in the direction of interest can be computed. If the distance exceeds the minimum distance, then the target may trigger an alarm.

Note that the computation can be performed between every corresponding image pixel of path P, but if the path is comprised of line segments then the computation can be simplified by only considering the end points of those line segments and the points where the path intersects with the entry and exit pixels in the detection area.

A First Worked Example

A working example is now described, to illustrate how an intrusion detection system may operate.

The system employs a sensing device in the form of a video camera which is used to view and monitor a real scene (in the form of a field of view) such as the three-dimensional scene depicted in FIG. 2b. The image taken by the camera is a two-dimensional projection of that three-dimensional scene onto the image plane of the camera. The camera image is then displayed on a computer monitor or display.

To use the system, an operator defines a detection area, such as 102 in FIG. 2a, through interactions with a graphical user interface on the computer monitor. This corresponds to a virtual planar detection area in the three-dimensional scene, such as 105 in FIG. 2b.

There are many ways to calibrate the system, but for illustrative purposes, calibration occurs while a person walks around every part of the three-dimensional planar detection area 105, and their location on both the detection area 102 and the virtual image detection area 105 is recorded at every point. It will be appreciated that this establishes the mapping between the two detection areas. It will be appreciated that in some embodiments, areas outside the detection areas may also be calibrated.

Typically a moving target object differs in intensity from the background in front of which it moves. Thus, such an object can be detected by thresholding the difference between this image and an earlier image, and the object can then be tracked by first drawing a bounding box around the set of image pixels detected by this thresholded difference and then noting the position of the bottom centre of the bounding box as it moves from frame to frame of the video sequence. For every image captured by the video camera, the object is detected and its location noted (and thus tracked). The path of the target object can be estimated by a curve drawn through these points, or more simply as a series of line segments joining these points. This path is used to estimate where the object was in the detection area and if the object has travelled far enough in the direction of interest. It is important to consider the full estimated path because a fast moving object may only be detected in a few frames of video and provide insufficient points for reliable detection.

If an intruder now passes through the scene, and walks on the planar detection area 105, then the path of their feet in three-dimensional coordinates can be determined from the path of the image of their feet in the detection area 102. The distance, speed and direction of travel in three dimensions can all be determined readily from the corresponding metrics in image coordinates.

If a directional area is used, i.e. if a user has defined a detection vector for a detection area, then the direction for that directional area is specified in image coordinates. Three-dimensional coordinates can be determined from these image coordinates, or alternatively, the detection vector may be defined in three-dimensional coordinates, in which case the image coordinates can be determined. Since the mapping between the detection planes is defined, the appearance of a three-dimensional arrow sitting on the three-dimensional plane can also be determined by taking into account the scene perspective and scaling. If the detection vector arrow is moved up the screen then it could be made to appear to move away from the camera by reducing its size. If the arrow is rotated, then the correct three-dimensional rotation could be determined and the three-dimensional arrow adjusted accordingly.

Now, if an intruder walks across the three-dimensional detection area monitored by the camera, it is clear that the direction in the three-dimensional coordinate system and the direction specified in terms of the directional area in three-dimensional coordinates can both be determined. The distance travelled in the direction of the directional area may then be established by determining a component of the displacement in the direction of the detection vector. If that distance exceeds the minimum displacement, then an alarm condition may be raised. By this example it is clear that the system distinguishes between an intruder approaching the protected property and a vehicle passing by.

A Second Worked Example

Figure 7:
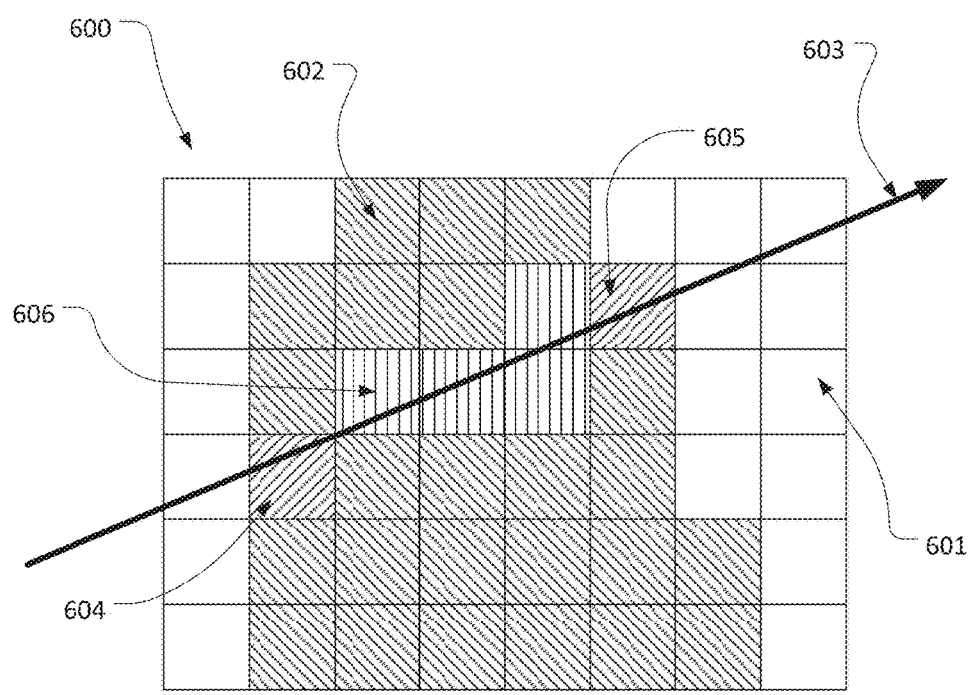
FIG. 7 shows how the entry and exit points of an object path as the object passes through a detection area are determined, in accordance with an example embodiment.

FIG. 7 shows how the entry and exit from a detection area can be determined. In this Figure, the two-dimensional image 600 consists of picture elements (pixels) 601, and the detection area is defined by the shaded pixels 602. The path 603 of an object passes through the detection area 602, entering it at a first pixel 604 and exiting it at a final pixel 605. The three-dimensional coordinates of pixels 604 and 605 can be computed from the two-dimensional positions in the image (as discussed in detail above), and the three-dimensional coordinates may then be used to determine the component of the three-dimensional distance traveled in the direction specified. Furthermore, any or all other pixels 606 along the path inside the detection area may be similarly transformed and considered. This is particularly important if the path is not straight.

If the detection area 602 above is narrow enough where the object path passes through, then the pixels 604 and 605 may be the same pixel. In this cast, the object path is still determined and if the path passes through the area in the correct direction, then it may trigger an alarm. If the object path passes through the area in the wrong direction, an alarm will not be triggered. Thus, even with a minimum distance of zero, and/or an area that is only one pixel wide, the direction can still be relevant to detect an intrusion.

Figure 8:
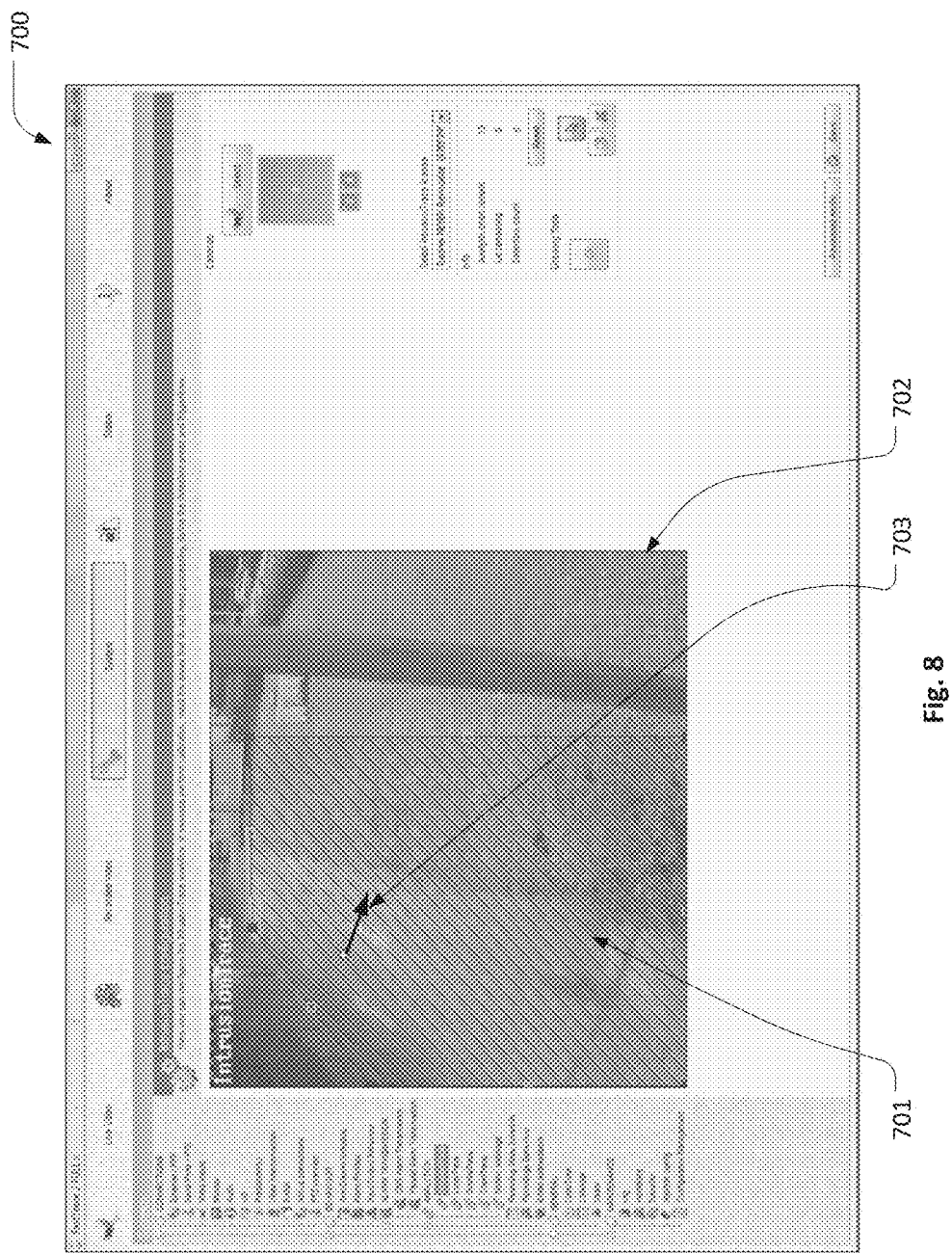
FIG. 8 is an example graphical user interface showing a field of view of a sensing device that monitors an area with a road and an adjacent gravel area, wherein both a detection area and a detection vector have already been inputted by a user, in accordance with an example embodiment.

Turning now to FIG. 8, an image detection area 701 is shown as displayed on an example graphical user interface 700. The image detection area 701 is indicated in cross-hatching over an image 702 of the field of view of a sensing device such as a surveillance camera, wherein the image 702 shows a road leading to a building in the background, with the road having an adjacent gravel area to the right-hand side of the road. Also indicated is a detection vector 703 which is associated with the image detection area 701 and overlayed on the detection area 701. As is described in more detail above, the detection vector 703 indicates a minimum distance and direction of displacement in the image detection area 701, which in this instance is displacement in the three-dimensional area extending from an edge to the left-hand side of the road, across the road and the adjacent gravel area. The direction of the detection vector is indicated as being at a slight angle to the direction of directly crossing the road. In the event that an intruder (i.e. a target object) moves across this detection area 701, e.g., partially across the road or across the gravel area, the present system is to calculate a component of displacement of such target object in the direction of the detection vector 703, and if this component exceeds the specified minimum displacement in the direction of the detection vector 703, an alarm will be sounded. In order to calculate this displacement, three-dimensional coordinates of pixels of the target object are computed from the two-dimensional positions in the image, with the three-dimensional coordinates then being used to determine the particular component of the three-dimensional distance traveled in the direction specified.

Figure 9:
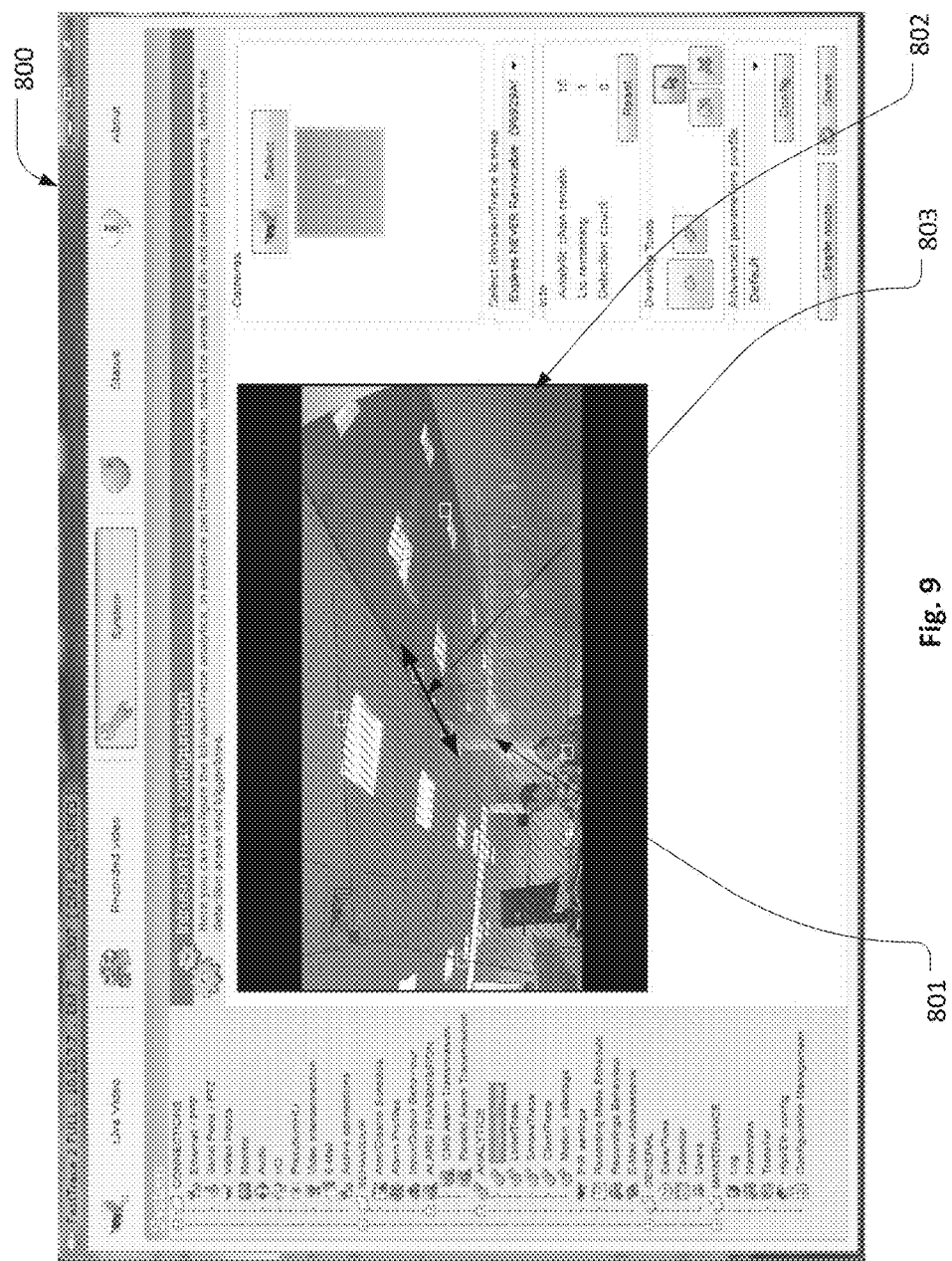
FIG. 9 is a similar example graphical user interface as depicted in FIG. 8, showing a field of view of a sensing device monitoring an office environment, again with both a detection area and a detection vector already having been inputted by a user, in accordance with an example embodiment.

FIG. 9 shows a similar graphical user interface 800 which shows a surveillance camera image 802 of an office environment. An image detection area 801 is again shown as cross-hatching over the image 802 while a detection vector 803 is overlayed as an arrow over the detection area 801. The detection vector 803 indicates a minimum distance and direction of displacement in the image detection area 802 as displacement in the three-dimensional area of the office. Should an intruder (i.e. a target object) move through the room, e.g., from the back of the room to the front of the room along the glass partition, or vice versa, an alarm will be sounded if the system determines that the displacement of the intruder in the detection area 801 has a component in the direction of the detection vector which exceeds the specified minimum displacement of the detection vector. As the detection vector applies to the entire detection area 802, it will be appreciated that any movement by an intruder that is calculated to have a component in the direction of the detection vector which exceeds the specified minimum level will result in an alarm activation.

Similar to the scenario depicted in FIG. 8, the calculations include computing three-dimensional coordinates of pixels of the target object from the two-dimensional positions in the image, then using these coordinates to determine the particular component of the three-dimensional distance travelled in the direction specified.

Figure 10:
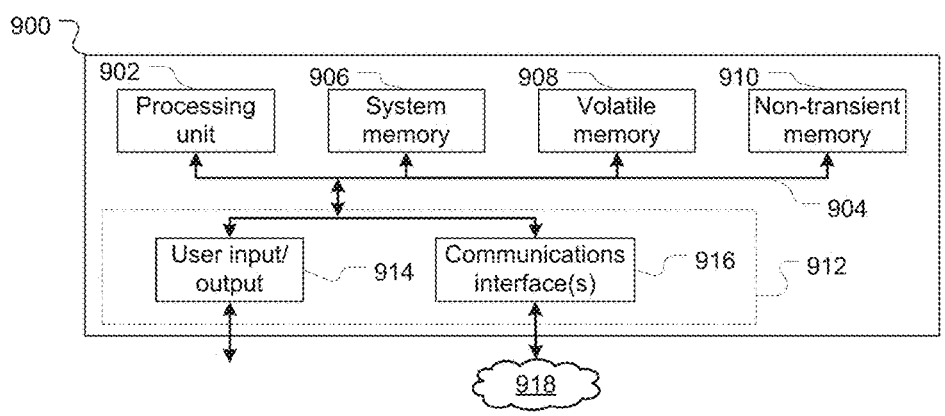
FIG. 10 is a block diagram illustrating a computer processing system for use as a central monitoring station 12, in accordance with an example embodiment.

FIG. 10 is a block diagram illustrating a typical computer processing system 900 suitable for use/configuration as the central monitoring system 12 as described above. For example, the typical computer system may be suitable for both the server 16 of the central monitoring system 12 as well as the operator stations 22.1, 22.2.

Computer processing system 900 comprises a processing unit 902. The processing unit 902 may comprise a single computer-processing device (e.g. a central processing unit, graphics processing unit, or other computational device), or may comprise a plurality of computer processing devices. In some instances processing is performed solely by processing unit 902, however in other instances processing may also, or alternatively, be performed by remote processing devices accessible and useable (either in a shared or dedicated manner) by the computer processing system 900.

Through a communications bus 904 the processing unit 902 is in data communication with one or more machine-readable storage (memory) devices that store instructions and/or data for controlling operation of the computer processing system 900. In this instance computer processing system 900 comprises a system memory 906 (e.g. a BIOS or flash memory), volatile memory 908 (e.g. random access memory such as one or more DRAM modules), and non-volatile/non-transient memory 910 (e.g. one or more hard disk or solid state drives).

Computer processing system 900 also comprises one or more interfaces, indicated generally by 912, via which the computer processing system 900 interfaces with various components, other devices and/or networks. Other components/devices may be physically integrated with the computer processing system 900, or may be physically separate. Where such devices are physically separate connection with the computer processing system 400 may be via wired or wireless hardware and communication protocols, and may be direct or indirect (e.g., networked) connections.

Wired connection with other devices/networks may be by any standard or proprietary hardware and connectivity protocols. For example, the computer processing system 900 may be configured for wired connection with other devices/communications networks by one or more of: USB; FireWire; eSATA; Thunderbolt; Ethernet; Parallel; Serial; HDMI; DVI; VGA; AudioPort. Other wired connections are possible.

Wireless connection with other devices/networks may similarly be by any standard or proprietary hardware and communications protocols. For example, the computer processing system 400 may be configured for wireless connection with other devices/communications networks using one or more of: infrared; Bluetooth (including early versions of Bluetooth, Bluetooth 4.0/4.1/4.2 (also known as Bluetooth low energy) and future Bluetooth versions); Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, the devices to which computer processing system 900 connects—whether by wired or wireless means—allow data to be input into/received by computer processing system 900 for processing by the processing unit 902, and data to be output by computer processing system 900. Example devices are described below, however it will be appreciated that not all computer processing systems will comprise all mentioned devices, and that additional and alternative devices to those mentioned may well be used.

For example, computer processing system 900 may comprise or connect to one or more input devices by which information/data is input into (received by) the computer processing system 900. Such input devices may comprise physical buttons, alphanumeric input devices (e.g., keyboards), pointing devices (e.g., mice, track-pads and the like), touchscreens, touchscreen displays, microphones, accelerometers, proximity sensors, GPS devices and the like. Computer processing system 900 may also comprise or connect to one or more output devices controlled by computer processing system 900 to output information. Such output devices may comprise devices such as indicators (e.g., LED, LCD or other lights), displays (e.g., LCD displays, LED displays, plasma displays, touch screen displays), audio output devices such as speakers, vibration modules, and other output devices. Computer processing system 400 may also comprise or connect to devices capable of being both input and output devices, for example memory devices (hard drives, solid state drives, disk drives, compact flash cards, SD cards and the like) which computer processing system 400 can read data from and/or write data to, and touchscreen displays which can both display (output) data and receive touch signals (input).

Computer processing system 900 may also connect to communications networks (e.g. the Internet, a local area network, a wide area network, a personal hotspot etc.) to communicate data to and receive data from networked devices, which may be other computer processing systems.

The architecture depicted in FIG. 10 may be implemented in a variety of computer processing systems, for example a laptop computer, a netbook computer, a tablet computer, a smart phone, a desktop computer, a server computer. It will also be appreciated that FIG. 10 does not illustrate all functional or physical components of a computer processing system. For example, no power supply or power supply interface has been depicted, however computer processing system 900 will carry a power supply (e.g. a battery) and/or be connectable to a power supply. It will further be appreciated that the particular type of computer processing system will determine the appropriate hardware and architecture, and alternative computer processing systems may have additional, alternative, or fewer components than those depicted, combine two or more components, and/or have a different configuration or arrangement of components.

Operation of the computer processing system 900 is also caused by one or more computer program modules which configure computer processing system 900 to receive, process, and output data. One such computer program module will be an operating system such as (by way of non-limiting example) Apple iOS or Android.

As used herein, the term "module" to refers to computer program instruction and other logic for providing a specified functionality. A module can be implemented in hardware, firmware, and/or software. A module is typically stored on the storage device 908, loaded into the memory 906, and executed by the processor 902.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

It will be appreciated that the types of computer systems 900 used by the respective entities of FIG. 1 may vary depending upon the embodiment and the processing power used by the entity. For example, the server systems may comprise multiple blade servers working together to provide the functionality described herein.

What is claimed is:

1. A method of intrusion detection, the method including:
    displaying sensing device output data as one or more images of a field of view of a sensing device;
    defining at least one intrusion detection criterion via a graphical user interface by:
        receiving user input to define and display an image detection area in relation to the one or more images of the field of view, wherein the image detection area is correlated to a detection area to be monitored by the sensing device for intrusion detection; and
        receiving user input that defines a detection vector associated with the detection area, said detection vector specifying a predetermined minimum displacement and direction of displacement of a potential intruder in the field of view to be monitored,
    displaying a graphical representation of the detection vector on the image detection area;
    detecting a target object; and
    tracking the target object at least partially through the detection area and determining whether the progressive displacement of the target object has a component which exceeds the minimum displacement in the direction of the detection vector.

2. The method as claimed in claim 1, further including activating an alarm condition if the target object's displacement has a component which is determined to exceed the minimum displacement in the direction of the detection vector, wherein at least one of an initial position of the target object or the position of the target object where the minimum displacement is exceeded, is within the detection area.

3. The method as claimed in claim 1, further including activating an alarm condition if the target object's displacement is only within the detection area and the target object's displacement exceeds the minimum displacement.

4. The method as claimed in claim 2 wherein the component of displacement in the direction of the detection vector is determined with the use of the equation:

$$l = \frac{\vec{S} \cdot \vec{D}}{|D|}$$

where l is the component of displacement in the direction of the detection vector;
vector $\vec{S}$ represents a distance and direction of the target object as tracked through the detection area in a three-dimensional area;
vector $\vec{D}$ represents the detection vector; and
|D| represents the absolute value of the detection vector $\vec{D}$.

5. The method as claimed in claim 1 wherein the image detection area is a surface in a three-dimensional space onto which object movements in the corresponding two-dimensional image are projected and interpreted.

6. The method as claimed in claim 1 wherein the detection area is defined as directional by specifying the detection vector in relation to the detection area.

7. The method as claimed in claim 6 wherein the detection vector is specified as bidirectional and an alarm condition is activated when it is determined that the progressive displacement of the target object exceeds the minimum displacement in either direction of the vector.

8. The method as claimed in claim 1 wherein the graphical representation of the detection vector is overlaid on the image detection area as a flat arrow on a two-dimensional image plane.

9. The method as claimed in claim 8 wherein the end points of this flat arrow detection vector are mapped to corresponding points in the detection area monitored by the sensing device, thereby to define the direction and minimum displacement in the detection area monitored.

10. The method as claimed in claim 1 wherein the graphical representation of the detection vector is overlaid on the image detection area as a three-dimensional arrow detection vector within the detection area monitored, wherein the position of the end points of the three-dimensional area is correlated with the image detection area, thereby to enable the rendering of the detection vector in the correct perspective.

11. The method as claimed in claim 1 wherein the one or more user inputs is received through one or more inputs of a pointing device on the graphical user interface, one or more inputs through a touch screen, one or more inputs of coordinates of the detection vector, an input of an angle of direction with relation to an axis, and/or an input of a numerical value.

12. The method as claimed in claim 1 wherein the displacement and/or direction of the detection vector is defined or adjusted through manipulation of arrows via the graphical user interface.

13. The method as claimed in claim 1 wherein the displacement and/or direction of the detection vector is defined or adjusted by receiving a numerical value for the length and/or angle of direction of the detection vector from a user through the graphical user interface.

14. The method as claimed in claim 1 wherein the angle of direction of the detection vector is specified in terms of a navigational bearing in a three-dimensional area.

15. The method as claimed in claim 1 wherein the direction of the detection vector is determined as perpendicular to a particular edge of the detection area, after the user has selected the particular detection area edge through the graphical user interface.

16. The method as claimed in claim 1 wherein the length of the graphical representation of the detection vector as displayed on the image detection area is not to scale.

17. The method as claimed in claim 1 wherein the sensing device is a surveillance camera.

18. The method as claimed in claim 1 wherein the step of tracking the target object at least partially through the detection area includes estimating a target object path from discreet detections of the target object within the field of view within the detection area of the sensing device.

19. The method as claimed in claim 18 wherein the step of estimating the target object path further includes predicting various sections of the target object path.

20. The method as claimed in claim 18 wherein the step of predicting various sections of the target object path includes one or more of the following:

predicting the target object path prior to initial detection of the target object by back-predicting where the target object may have entered the field of view to the position of initial detection;

predicting the target object path between discreet detections of the target object; and predicting the target object path between a final point of detection of the target object in the field of view and a likely position where the target object may have left the field of view.

21. A system including:

a user interface in order to receive inputs from a user of the system;

at least one processing unit and at least one memory for storing instructions for execution by the at least one processing unit, the instructions executed to:

display sensing device output data as one or more images of a field of view of a sensing device;

define at least one intrusion detection criterion via a graphical user interface by:

receiving user input to define and display an image detection area in relation to the one or more images of the field of view, wherein the image detection area is correlated to a detection area to be monitored by the sensing device for intrusion detection;

receiving user input that specifies a detection vector associated with the detection area, said detection vector specifying a predetermined minimum displacement and direction of displacement of a potential intruder in the field of view to be monitored;

display a graphical representation of the detection vector on the image detection area;

detect a target object; and track the target object at least partially through the detection area and determine whether the progressive displacement of the target object has a component which exceeds the minimum displacement in the direction of the detection vector.

22. The system as claimed in claim 21, further wherein the instructions are executed to activate an alarm condition if the target object's displacement has a component which is determined to exceed the minimum displacement in the direction of the detection vector, wherein at least one of an initial position of the target object or the position of the target object where the minimum displacement is exceeded, is within the detection area.

23. The system as claimed in claim 21, further wherein the instructions are executed to activate an alarm condition if the target object's displacement is only within the detection area and the target object's displacement exceeds the minimum displacement.

24. The system as claimed in claim 22, wherein the component of displacement in the direction of the detection vector is determined with the use of the equation:

$$l = \frac{\vec{S} \cdot \vec{D}}{|D|}$$

where l is the component of displacement in the direction of the detection vector;

vector $\vec{S}$ represents a distance and direction of the target object as tracked through the detection area in a three-dimensional area;

vector $\vec{D}$ represents the detection vector; and

|D| represents the absolute value of the detection vector $\vec{D}$.

25. The system as claimed in claim 21, wherein the image detection area is a surface in a three-dimensional space onto which object movements in the corresponding two-dimensional image are projected and interpreted.

* * * * *